United States Patent [19]

Schmitt et al.

[11] Patent Number: 4,850,262
[45] Date of Patent: Jul. 25, 1989

[54] BRAKE BOOSTER

[75] Inventors: Edgar Schmitt, Vaihingen/Enz; Heinz Siegel, Stuttgart, both of Fed. Rep. of Germany

[73] Assignee: Robert Bosch GmbH, Stuttgart, Fed. Rep. of Germany

[21] Appl. No.: 189,872

[22] Filed: May 3, 1988

[30] Foreign Application Priority Data

May 9, 1987 [DE] Fed. Rep. of Germany ....... 3715565

[51] Int. Cl.$^4$ .............................................. F15B 9/10
[52] U.S. Cl. ................................................. 91/376 R
[58] Field of Search ............... 91/376 R, 374, 378; 60/547.1

[56] References Cited

U.S. PATENT DOCUMENTS

| | | | |
|---|---|---|---|
| 2,404,512 | 7/1946 | May et al. .............................. | 91/374 |
| 2,544,042 | 3/1951 | Pontius, III ....................... | 91/376 X |
| 2,698,205 | 12/1954 | Gagen . | |
| 2,761,427 | 9/1956 | Shumaker ......................... | 91/376 X |
| 3,596,564 | 8/1971 | Johnson ............................ | 91/376 R |
| 3,691,903 | 9/1972 | Shellhouse ....................... | 91/376 R |
| 4,309,934 | 1/1982 | Volkmar et al. .................. | 91/376 R |

Primary Examiner—Edward K. Look
Attorney, Agent, or Firm—Edwin E. Greigg

[57] ABSTRACT

A brake booster in a housing, having a servo piston slidably supported in the housing and having a piston rod protruding into the housing for transmitting a brake force. A chamber is provided in the servo piston for receiving brake fluid drawn after the opening of a valve from a reservoir or supply container and pumped via a pump or the like. The chamber also communicates via a further valve or the like with a return line to the supply container. To improve the closing behavior of the valve, the first valve for the admission of the brake fluid is formed in the chamber, embodied as a servo chamber, by a valve bushing, or its annular collar, and a valve seat in a blind bore recess in the servo piston. On the other side, the valve bushing, with a bottom, engages the inside of a bell-shaped valve seat, which together with the piston rod, or a slide connected to the piston rod, forms the valve for returning the brake fluid.

20 Claims, 1 Drawing Sheet

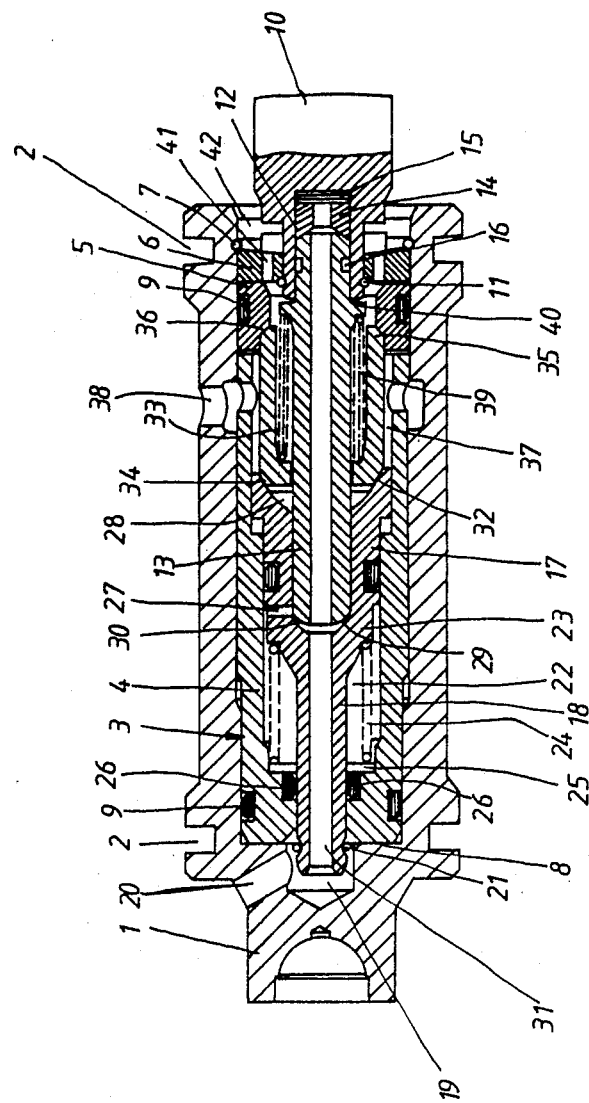

BRAKE BOOSTER

BACKGROUND OF THE INVENTION

The invention relates to improvements in brake boosters for vehicles. This application is being filed concurrently with Ser. No. 189,893, for related subject matter, further identified by R. 21201. German patent application P 37 15 564.4 has already described such a brake booster, which replaces the valves provided in known brake boosters. The present exemplary embodiment is intended to contribute further to improving the closing of the valves in the brake booster, and in particular to facilitate centering the valves.

SUMMARY AND OBJECT OF THE INVENTION

A brake booster as set forth herein includes a first valve for admission of the brake fluid into a servo chamber, and a valve bushing with an annular collar, with which a valve seat in a blind bore recess in the servo piston is associated. On the other side of this valve, the valve bushing has a bottom that is rounded at its periphery and engages a bell-shaped valve seat of a valve cone. This means that the valve bushing is not firmly connected on any side to any other element of the brake booster. Thus the valve bushing floats between the valve seat and the valve cone and hence is easily centered. Centering is facilitated still further by embodying the valve seats as bell-shaped or spherical, with an annular collar or bottom in each case being adapted to this shape. This assures that when the valve closes, the annular collar will slide into the valve seat.

A slide protrudes from the piston rod and with its face end forms a closing element for an outlet valve. This slide may be disposed movably to a limited extent in the piston rod, but it is also conceivable for the slide to be formed onto the piston rod itself. In either case, however, the slide penetrates the valve bushing. According to the invention, a spring should be disposed between the valve bushing and the slide or piston rod, by way of which spring the slide carries the valve bushing along with its own movement in response to brake pressure and keeps the valve bushing in the closing position against the valve cone.

The slide also engages an inner chamber of the valve cone. This inner chamber likewise tapers in belllike fashion on its end toward the bottom and terminates in an axial bore through the valve cone. This tapered portion forms the valve seat, with which the face end of the slide fits. Since the slide is guided with radial play in the inner chamber, the return of servo brake fluid from the servo chamber can be effected by means of intermediate chambers between the valve bushing and the slide.

A radial bore is also provided, which connects the inner chamber with a chamber partially surrounding the valve cone. In this latter chamber, the valve cone is supported, for example by the formation of an annular collar, via a spring against a corresponding stop disk. The radial bore remains open both when the outlet valve for the servo brake fluid opens and when it closes, so that fluid can emerge from and be aspirated into the chamber at any time.

For the valve seat forming the first part of the inlet valve, it is possible for this valve seat to be formed out of the servo piston itself; however, that would dictate a two-piece embodiment of the servo piston itself, since the valve bushing would for instance rest on the valve seat from the inside. It is therefore provided that this valve seat be formed by an annular sheath, which in turn is preferably supported between a sheath and a perforated plate in a blind bore recess in the servo piston. The perforated plate is supported, in the position of repose, against a snap ring, so that the annular sheath is movable to only a very limited extent.

In this case, the sheath encompasses the entire valve cone and part of the valve bushing as well and for instance between the two seats of the valve bushing forms an annular chamber for connection with the supply container or reservoir for servo brake fluid. The chamber in which the spring for the valve cone is supported is then also formed between the sheath and the valve cone, or a rod. This rod, which is penetrated by the axial bore, penetrates the bottom of the sheath and on its other end has a snap ring, so that the valve cone cannot slide out of the bottom of the sheath. Adjacent to the bottom of the sheath is an inclined bore that leads back to the supply container.

It is therefore the object of this invention to provide improved valve closing behavior via the articulated valve bushing.

The invention will be better understood and further objects and advantages thereof will become more apparent from the ensuing detailed description of a preferred embodiment taken in conjunction with the drawing.

BRIEF DESCRIPTION OF THE DRAWING

The single drawing FIGURE is a longitudinal section taken through a brake booster according to the invention.

DESCRIPTION OF THE PREFERRED EMBODIMENT

The brake booster includes a servo piston 1, which is seated in a housing, not shown in further detail, of a master brake cylinder, being guided in this housing by seals provided in grooves 2.

The servo piston 1 has an axial blind bore recess 3. This blind bore recess 3 is substantially lined with a sheath 4, adjoining which is an axially aligned sheath 5 which seats upon a perforated plate 6. The perforated plate 6 strikes a snap ring 7 fixed within the servo piston 1; on the other end, the sheath 4 is supported on a bottom shoulder 8 of the blind bore recess 3. The sheath 4 and annular sheath 5 have seals 9 between them and the servo piston 1.

A piston rod 10 extends through the perforated plate 6 and engages a shoulder on a slide 13 about which the inner end surrounds. A snap ring 11 prevents the piston rod 10 from sliding out of the perforated plate 6.

The piston rod 10 has a blind bore 12 toward the face end into which the end of the slide 13 is inserted. The slide is braced in the blind bore 12 against an end support 14 and shims 15. Toward the blind bore 12 the slide is also equipped with a sealing ring 16.

The other end of the slide 13 passes through a valve cone 17 within the sheath 4 and engages the inside bore of the valve cone 17 which is provided with a surrounding seal. A rod 18 includes a large diameter end 23 which is guided in the sheath 4 and is provided with a small diameter portion that passes through an axial bore in the blind end of the sheath 4. The small diameter end leads into a bottom chamber 19 in the servo piston 1. An inclined bore 20 branches off from this bottom chamber 19, leading for example into a master brake chamber of the master brake cylinder; this bottom chamber communicates with the brake fluid supply container. In the bottom chamber 19, a snap ring 21 is also slipped onto the small diameter end of rod 18, limiting the stroke travel of the rod 18.

A chamber 22 is also formed between the rod 18 and the sheath 4, the large diameter of the rod 18 and the blind end of the sheath. The large diameter end of the rod 18 forms an annular collar 23 which is engaged by a spring 24, which seats on a disk 25 in the chamber 22 that covers a ring seal 26 between the small diameter end of rod 18 and the sheath 4.

The chamber 22 communicates via a radial bore 27 in the annular collar with an inner chamber 28 in the valve cone 17 via a passage along the slide 13 which has a loose fit within the valve cone 17 and which also engages the slide 13. The bottom of the inner chamber 28 is embodied by a valve seat 29 on the end of the annular collar 33 against which the face end 30 of the slide 13 fits thereby acting as a closing element. With this face end 30, an opening to an axial bore 31 in the valve cone 17 or rod 18 can be closed from the chamber 28.

Following the inner chamber 28, in which the slide 13 is guided with radial play, the valve cone 17 widens to an enlarged diameter end portion to form a bell-shaped or spherical valve seat 32. A valve bushing 33 fits into this correspondingly shaped valve seat 32 which likewise surrounds the slide 13 with radial play. The bottom 34 of the valve bushing 33 is adapted to the bell-shaped valve seat 32, which makes centering of the valve bushing 33 considerably easier. The peripheral collar 35 of the valve bushing 33 is also convexly adapted and thus fits into a valve seat 36 that is formed by the annular sheath 5.

Between the two valve seats 32 and 36, the valve bushing 33 and the sheath 4 form an annular chamber 37, into which a radial inlet 38 passes through the servo-piston for admitting servo brake fluid into the chamber 37.

Within the valve bushing, that is, between the valve bushing 33 and the slide 13, there is a spring 39, which is supported on the bottom of the valve bushing 33 and on an annular flange 40 on the slide 13.

In the position of repose, the valve cone 17 is subject to the pressure of the spring 24. The valve cone acts with the bell-shaped valve seat 32 upon the valve bushing 33, pressing it with its annular collar 35 against the valve seat 36. This prevents servo brake fluid from flowing out of the annular chamber 37, either through the seat valve formed by the annular collar 35 and the valve seat 36, or through bores 41 in the perforated plate 6, to a servo chamber 42 formed between the housing not shown and the piston 10.

If brake pressure is now exerted upon the piston rod 10 by a brake pedal, then the piston rod displaces the slide 13 to the left, whereupon the face end 30 of the slide 13 meets the valve seat 29 and interrupts the return flow for the servo brake fluid. Via the spring 39, however, the seat valve between the valve bushing 33 and the valve cone 17 is kept closed. If brake pressure continues to be exerted, the valve cone 17 is displaced to the left, followed by the valve bushing 33. The peripheral collar 35 of the valve cone lifts from its valve seat 36, and servo brake fluid can flow via the bores 41 in the perforated plate 6 into the servo chamber 42 and downstream of the servo piston 1.

If the brake pressure lessens, the valve cone 17 and with it the valve bushing 33 are displaced to the right, until the peripheral collar 35 rests on the valve seat 36. The slide 13 then lifts with its face end 30 away from the valve seat 29, and the servo brake fluid can flow out of the chamber 42, through the bores 41 and past the spring 39, through the radial play between the slide 13 and the valve bushing 33 and the radial play of the inner chamber 28, and into the axial bore 31 and out through bore 20 to the brake fluid container.

By means of its articulated embodiment at both ends, the valve bushing 33 assures accurate closing of the the seat valve 35/36 in any situation.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A brake booster comprising a servo piston (1) for operation in a housing, a blind bore (3) in said servo piston with an open end, a perforated plate (6) secured in the open end of said servo piston, a piston rod (10) which has an end portion that extends through said perforated plate, a slide 13 connected to said rod in a bore therein, a valve bushing (33) in said servo piston blind bore, a first valve formed by said valve bushing including an annular collar (35) and a first valve seat (36) for controlling brake fluid flow from a brake fluid supply to a servo chamber (42), said valve bushing further including a bottom (34), adapted to engage a bellshaped element forming a second valve seat (32) of said valve bushing, said bell-shaped element including a third valve seat (29) which together with one end (30) of said slide (13) forms a valve for controlling brake fluid return to said brake fluid supply.

2. A brake booster as defined by claim 1, in which said first valve seat (36) and said second valve seat (32) are bell-shaped in embodiment, and said annular collar (35) and said bottom (34) have correspondingly adapted surfaces.

3. A brake booster as defined by claim 1, in which said valve bushing (33) surrounds the slide (13) and communicates with said slide via a spring (39).

4. A brake booster as defined by claim 2, in which said valve bushing (33) surrounds the slide (13) and communicates with said slide via a spring (39).

5. A brake booster as defined by claim 1, in which said bell-shaped element is a valve cone (17) that surrounds an end portion of said slide, said valve cone including a bottom portion which forms said valve seat, an axial bore (31) adjoins said valve seat (29) and serves as a brake fluid return line, and an inner chamber 28 is formed by said valve cone and said valve bushing.

6. A brake booster as defined by claim 2, in which said bell-shaped element is a valve cone (17) that surrounds an end portion of said slide, said valve cone including a bottom portion which forms said valve seat, an axial bore (31) adjoins said valve seat (29) and serves as a brake fluid return line, and an inner chamber 28 is formed by said valve cone and said valve bushing.

7. A brake booster as defined by claim 3, in which said bell-shaped element is a valve cone (17) that surrounds an end portion of said slide, said valve cone including a bottom portion which forms said valve seat, an axial bore (31) adjoins said valve seat (29) and serves as a brake fluid return line, and an inner chamber 28 is formed by said valve cone and said valve bushing.

8. A brake booster as defined by claim 4, in which said bell-shaped element is a valve cone (17) that surrounds an end portion of said slide, said valve cone including a bottom portion which forms said valve seat, an axial bore (31) adjoins said valve seat (29) and serves as a brake fluid return line, and an inner chamber 28 is formed by said valve cone and said valve bushing.

9. A brake booster as defined by claim 5, which includes a radial bore (27) that branches off from said inner chamber (28) and leads to a second chamber (22) and a spring (24) in said second chamber (22) which supports said valve cone (17).

10. A brake booster as defined by claim 1, in which said first valve seat (36) is formed by an annular sheath (5) supported between a sheath (4) and said perforated plate (6) in the blind bore recess (3) in the servo piston (1).

11. A brake booster as defined by claim 2, in which said valve seat (36) is formed by an annular sheath (5) supported between a sheath (4) and said perforated plate (6) in the blind bore recess (3) in the servo piston (1).

12. A brake booster as defined by claim 3, in which said valve seat (36) is formed by an annular sheath (5) supported between a sheath (4) and said perforated plate (6) in the blind bore recess (3) in the servo piston (1).

13. A brake booster as defined by claim 5, in which said valve seat (36) is formed by an annular sheath (5) supported between a sheath (4) and said perforated plate (6) in the blind bore recess (3) in the servo piston (1).

14. A brake booster as defined by claim 9, in which said valve seat (36) is formed by an annular sheath (5) supported between a sheath (4) and said perforated plate (6) in the blind bore recess (3) in the servo piston (1).

15. A brake booster as defined by claim 1, in which said perforated plate (6) is supported by a snap ring (7).

16. A brake booster as defined by claim 5, in which said sheath (4) surrounds said valve cone (17), and said valve cone (17) includes a rod portion (18) that penetrates a bottom (8) of said sheath (4) and is fixed therein with a snap ring (21) and said rod portion includes said axial bore (31).

17. A brake booster as defined by claim 6, in which said sheath (4) surrounds said valve cone (17), and said valve cone (17) includes a rod portion (18) that penetrates a bottom (8) of said sheath (4) and is fixed therein with a snap ring (21) and said rod portion includes said axial bore (31).

18. A brake booster as defined by claim 7, in which said sheath (4) surrounds said valve cone (17), and said valve cone (17) includes a rod portion (18) that penetrates a bottom (8) of said sheath (4) and is fixed therein with a snap ring (21) and said rod portion includes said axial bore (31).

19. A brake booster as defined by claim 8, in which said sheath (4) surrounds said valve cone (17), and said valve cone (17) includes a rod portion (18) that penetrates a bottom (8) of said sheath (4) and is fixed therein with a snap ring (21) and said rod portion includes said axial bore (31).

20. A brake booster as defined by claim 9, in which said sheath (4) surrounds said valve cone (17), and said valve cone (17) includes a rod portion (18) that penetrates a bottom (8) of said sheath (4) and is fixed therein with a snap ring (21) and said rod portion includes said axial bore (31).

* * * * *